(12) United States Patent
Irisawa et al.

(10) Patent No.: US 7,564,050 B2
(45) Date of Patent: Jul. 21, 2009

(54) RADIATION IMAGE DETECTOR

(75) Inventors: Kaku Irisawa, Kanagawa-ken (JP); Yasuhisa Kaneko, Kanagawa-ken (JP); Shigeru Nakamura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/045,478

(22) Filed: Mar. 10, 2008

(65) Prior Publication Data
US 2008/0224042 A1   Sep. 18, 2008

(30) Foreign Application Priority Data
Mar. 9, 2007   (JP)   ............................. 2007-059489

(51) Int. Cl.
*G01N 23/00*   (2006.01)
(52) U.S. Cl. .................. 250/591; 250/370.09; 250/590
(58) Field of Classification Search ............ 250/370.09, 250/590, 591
See application file for complete search history.

(56) References Cited

U.S. PATENT DOCUMENTS

| | | | |
|---|---|---|---|
| 5,319,206 A * | 6/1994 | Lee et al. ................ | 250/370.09 |
| 5,861,052 A | 1/1999 | Meinander | |
| 5,962,856 A * | 10/1999 | Zhao et al. ............. | 250/370.09 |
| 6,075,256 A * | 6/2000 | Kaifu et al. ................... | 257/53 |
| 2001/0025938 A1* | 10/2001 | Imai ........................... | 250/591 |
| 2003/0034464 A1* | 2/2003 | Ogawa ....................... | 250/580 |

FOREIGN PATENT DOCUMENTS

JP   2006156555 A   6/2006

* cited by examiner

*Primary Examiner*—David P Porta
*Assistant Examiner*—Marcus H Taningco
(74) *Attorney, Agent, or Firm*—Sughrue Mion, PLLC

(57) ABSTRACT

A radiation image detector includes: a photoconductive layer that generates electric charges when irradiated by recording electromagnetic waves which have passed through an electrode layer; and detecting electrodes, for detecting signals corresponding to the electric charges generated in the photoconductive layer. The radiation image detector further includes: dielectrics that cover the edges of the detecting electrodes, the edges being the side surfaces and portions of surfaces continuous with the side surfaces of the detecting electrodes, that face the photoconductive layer; and a charge injection preventing layer, which is a conductor with respect to electric charges of the same polarity as the electric charges accumulated during recording of the image information, and an insulator with respect to electric charges of the opposite polarity from the accumulated electric charges, provided to cover at least the surfaces of the detecting electrodes that face the photoconductive layer which are not covered by the dielectric.

2 Claims, 8 Drawing Sheets

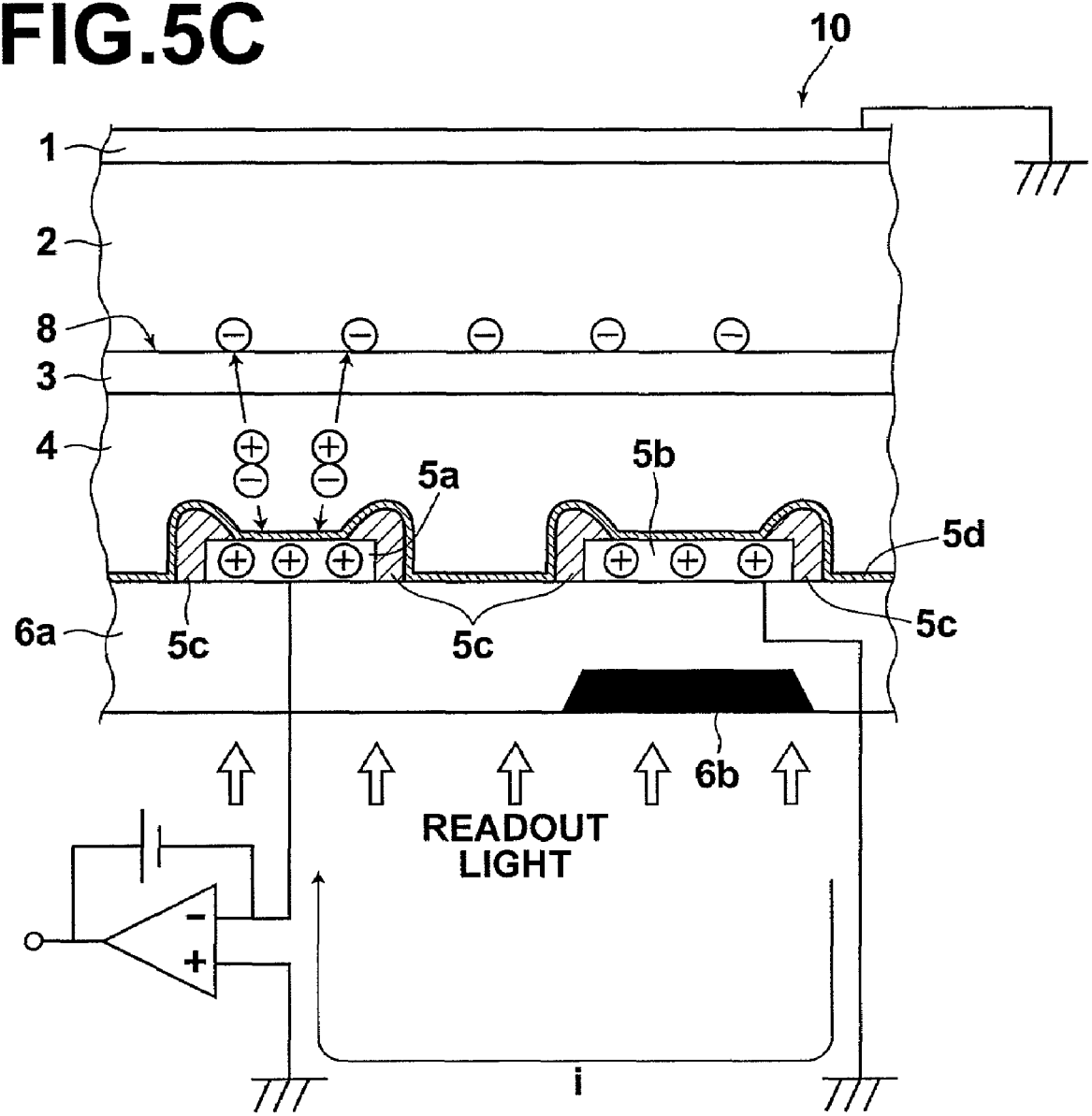

FIG.7A
TNF
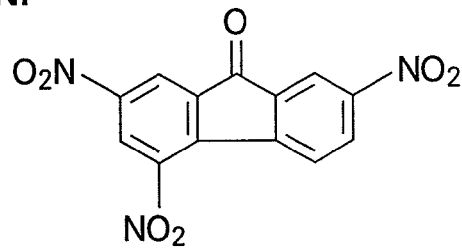
DMDB
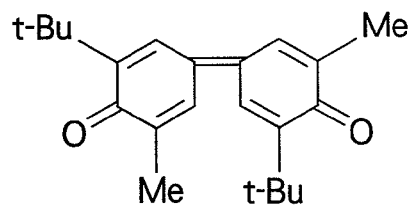
TAZ
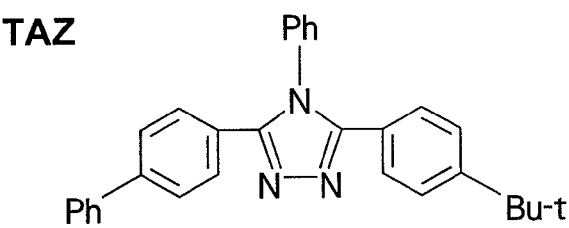
C60
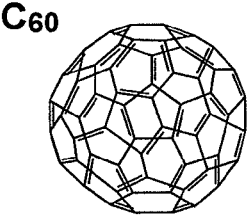
TPD
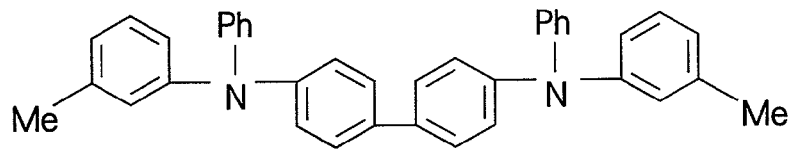

FIG.7B
m-MTDATA
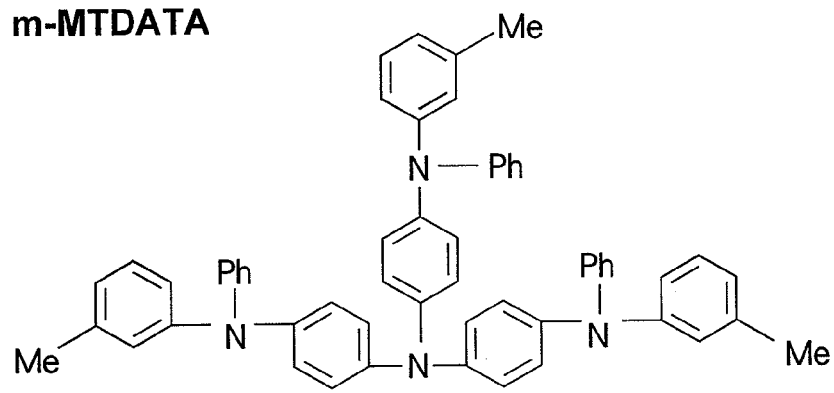
2-TNATA
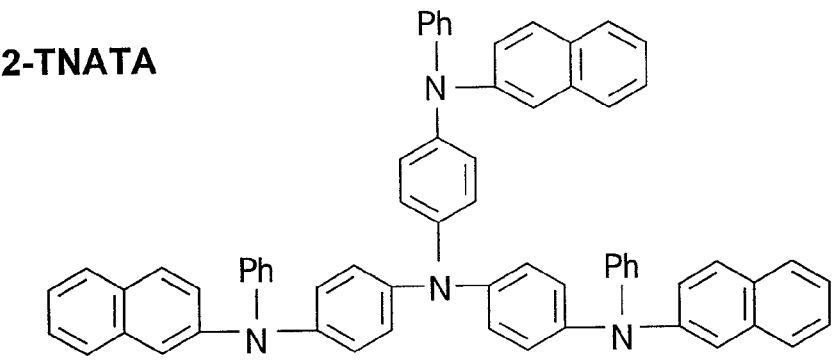
TPAC
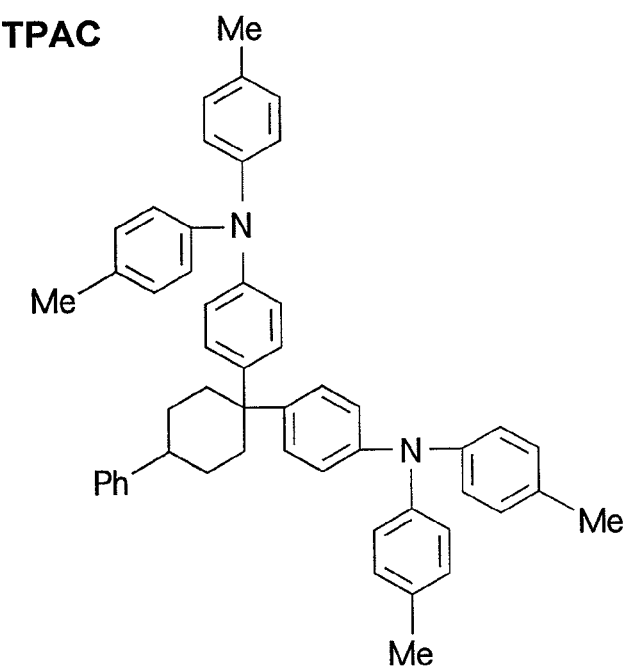

FIG.8
BCP
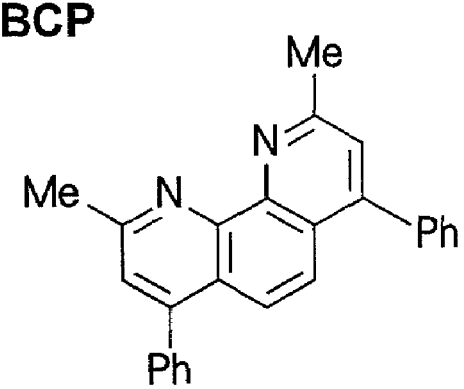
CYCLOHEXYL POLYCARBONATE (PCZ)
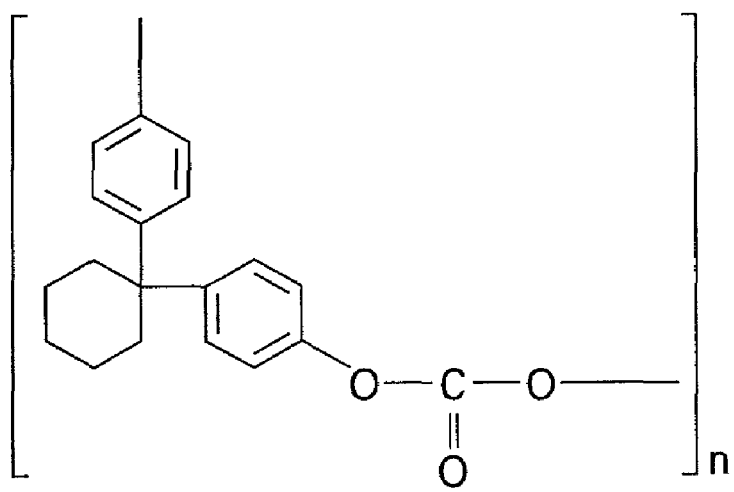
BIS PHENOL A — POLYCARBONATE (PC)
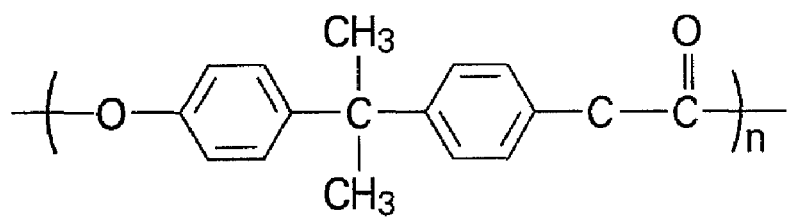

RADIATION IMAGE DETECTOR

BACKGROUND OF THE INVENTION

1. Field of the Invention

The present invention is related to a radiation image detector that records radiation images, by generating electric charges when irradiated by radiation and accumulating the generated electric charges.

2. Description of the Related Art

Various types of radiation image detectors that record radiation images of subjects, by generating electric charges when irradiated by radiation which has passed through the subjects and accumulating the generated electric charges have been proposed and are in practical use, in the field of medicine and the like.

There are two main types of radiation image detectors. One is a direct conversion type, in which radiation is directly converted to electric charges, which are accumulated. The other is an indirect conversion type, in which radiation is converted to light by a scintillator, such as that formed by CdI:Tl, GOS ($Gd_2O_2S$:Tb), electric charges are generated by the light entering a photoconductive layer, then the generated electric charges are accumulated. There are two main types of radiation image readout methods as well. One is an optical readout method that employs readout light. The other is an electrical readout method that employs TFT'S (Thin Film Transistors).

In a radiation image detector that employs the optical readout method, electric charges are generated in a recording photoconductive layer by irradiating radiation thereon. The generated electric charges are accumulated. Linear electrodes are charged with electric charges of a polarity opposite that of the accumulated electric charges. Readout light is irradiated to generate charge pairs in a readout photoconductive layer. The electric charges of the generated charge pairs are caused to combine with the accumulated electric charges and the electric charges which are charged on the linear electrodes, to read out the accumulated electric charges.

In a radiation image detector that employs the electrical readout method, electric charges which are generated by irradiating radiation thereon are collected by pixel electrodes corresponding to each pixel of an image. The collected electric charges are accumulated in accumulating capacitors, which are connected to the pixel electrodes. The accumulated electric charges are read out by turning electrical switches, such as TFT's, ON/OFF pixel by pixel.

Japanese Unexamined Patent Publication No. 2006-156555 discloses a radiation image detector of the type that employs the electrical readout method. An insulative film, or an insulative film that includes carbon particles or metallic particles is provided to cover all pixel electrodes of this radiation image detector, in order to improve flatness and film properties.

U.S. Pat. No. 5,861,052 discloses another radiation image detector of the type that employs the electrical readout method. Semiconductors are provided to cover the edges of individual pixel electrodes of this radiation image detector, in order to prevent movement of electric charges among adjacent pixel electrodes.

The aforementioned linear electrodes and pixel electrodes are detecting electrodes for detecting signals corresponding to electric charges which are generated by irradiating radiation onto photoconductive layers. Electrical fields are likely to be concentrated at the edges of detecting electrodes, and therefore, it is likely for electric charges to be injected into these edges. If electric charges are injected into detecting electrodes, image faults occur, and image quality deteriorates. Covering detecting electrodes with insulative materials is an effective measure to prevent electric charge injection. Japanese Unexamined Patent Publication No. 2006-156555 discloses a configuration in which the pixel electrodes are covered by the insulative film. However, the insulative film covers the flat electrode portions of the pixel electrodes, in addition to the edges thereof. Therefore, the charge transport properties are poor, resulting in reduced sensitivity and poor residual image lag characteristics. Note that Japanese Unexamined Patent Publication No. 2006-156555 proposes covering the pixel electrodes with a film that includes particles having charge transport properties in order to improve conductivity. In this case, however, electric charges will be more likely to be injected into the electrodes, thereby causing image faults.

U.S. Pat. No. 5,861,052 discloses a configuration in which the edges of pixel electrodes are covered by semiconductors. Semiconductors are highly conductive, which is advantageous from the viewpoints of sensitivity and residual image characteristics. However, the amount of injected charges will increase, and therefore this configuration is not an effective method for reducing image faults.

SUMMARY OF THE INVENTION

The present invention has been developed in view of the foregoing circumstances. It is an object of the present invention to provide a radiation image detector which is capable of suppressing image faults caused by charge injection into the edges of detecting electrodes, while maintaining high sensitivity and favorable residual image characteristics.

The radiation image detector of the present invention comprises:

an electrode layer that transmits recording electromagnetic waves bearing image information;

a photoconductive layer that generates electric charges when irradiated by the recording electromagnetic waves which have passed through the electrode layer;

a plurality of detecting electrodes provided on the side of the photoconductive layer opposite that of the electrode layer, for detecting signals corresponding to the electric charges generated in the photoconductive layer;

an accumulating section, for recording the image information, that accumulates the electric charges generated in the photoconductive layer when irradiated by the recording electromagnetic waves;

dielectrics that cover the edges of the detecting electrodes, the edges being the side surfaces and portions of surfaces of the detecting electrodes, which are continuous with the side surfaces, that face the photoconductive layer; and a charge injection preventing layer that functions as a conductor with respect to electric charges of the same polarity as the electric charges which are accumulated during recording of the image information (hereinafter, also referred to as "accumulated electric charges"), and functions as an insulator with respect to electric charges of the opposite polarity from the accumulated electric charges, provided to cover at least the surfaces of the detecting electrodes that face the photoconductive layer which are not covered by the dielectric.

Here, the aforementioned "electromagnetic waves" refers to light and radiation, for example.

Note that the photoconductive layer and the detecting layers are stacked within a predetermined stacking region. Therefore, the charge injection preventing layer and the dielectric of the present invention are provided to cover the portions of the detecting electrodes within the stacking region. The portions of the detecting electrodes outside the stacking region may or may not be covered by the dielectric and the charge injection preventing layer.

The charge injection preventing layer covers at least the surfaces of the detecting electrodes that face the photoconductive layer which are not covered by the dielectric, and may cover other portions as well. For example, a configuration may be adopted, wherein the charge injection preventing layer also covers the dielectric. In this case, it is preferable for the angle formed by the interface between the dielectric and the surfaces of the detecting electrodes that face the photoconductive layer and the interface between the dielectric and the charge injection preventing layer to be within a range of 5 to 45 degrees.

The order in which the dielectric and the charge injection preventing layer are stacked is not limited, and the charge injection preventing layer may be provided to cover the detecting electrodes after the edges thereof are covered by the dielectric. Alternatively, the detecting electrodes may be covered by the charge injection preventing layer, then the edges of the detecting electrodes may be covered by the dielectric.

In the radiation image detector of the present invention, the edges of the detecting electrodes are covered by the dielectric material. Dielectrics have insulating properties, and also lessen electrical fields due to their dielectric polarization properties. Thereby, charge injection into the edges of the detecting electrodes can be reduced, and image defects can be suppressed. In addition, the surfaces of the detecting electrodes that face the photoconductive layer and which are not covered by the dielectric are covered by the charge injection preventing layer that functions as a conductor with respect to electric charges of the same polarity as the electric charges which are accumulated during recording of the image information, and functions as an insulator with respect to electric charges of the opposite polarity from the accumulated electric charges. Therefore, charge transport properties can be secured for electric charges of the same polarity as the accumulated electric charges. Further, in radiation image detectors that employ the electrical readout method, the charge injection preventing layer prevents electric charges of a polarity opposite that of the accumulated charges from being injected into the photoconductive layer from the detecting electrodes. Accordingly, high sensitivity and favorable residual image characteristics can be realized. Generally, in radiation image detectors that employ the optical readout method, a readout photoconductive layer is provided between a photoconductive layer (recording photoconductive layer) that generates electric charges when irradiated by recording electromagnetic waves and detecting electrodes. The charge injection preventing layer can prevent electric charges of the polarity opposite that of the accumulated electric charges from being injected into the photoconductive layer from the detecting electrodes. Accordingly, high sensitivity and favorable residual image characteristics can be realized.

BRIEF DESCRIPTION OF THE DRAWINGS

FIG. 5C is a diagram for explaining an operation for reading out a radiation image from the radiation image detector of FIG. 1.

FIGS. 7A and 7B are diagrams that illustrates the structure of a material which can be utilized for a charge injection preventing layer.

FIG. 8 is a diagram that illustrates the structure of a material which can be utilized for a charge injection preventing layer.

BEST MODE FOR CARRYING OUT THE INVENTION

Figure 1:
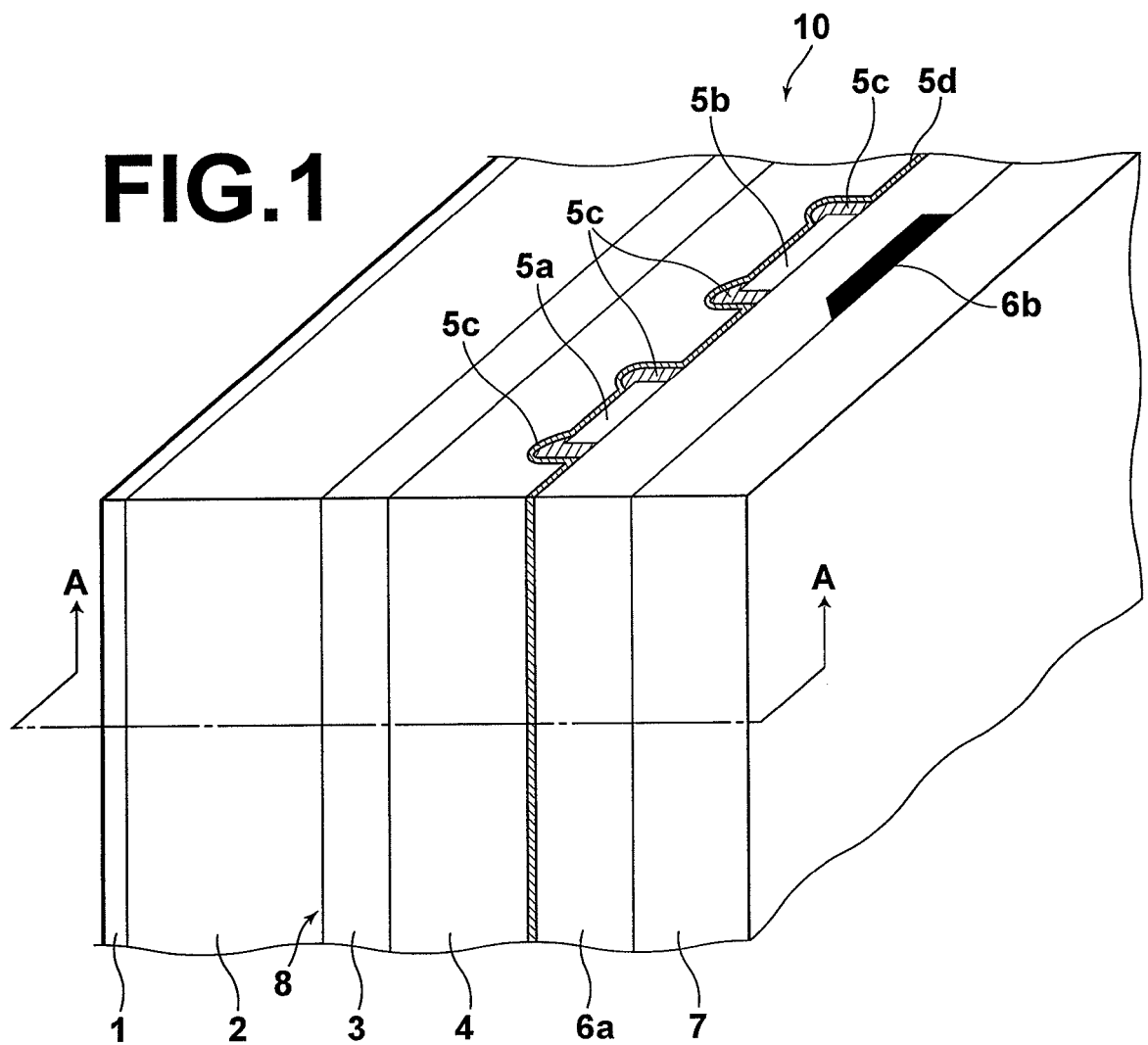
FIG. 1 is a perspective view of a radiation image detector according to a first embodiment of the present invention.
Figure 2:
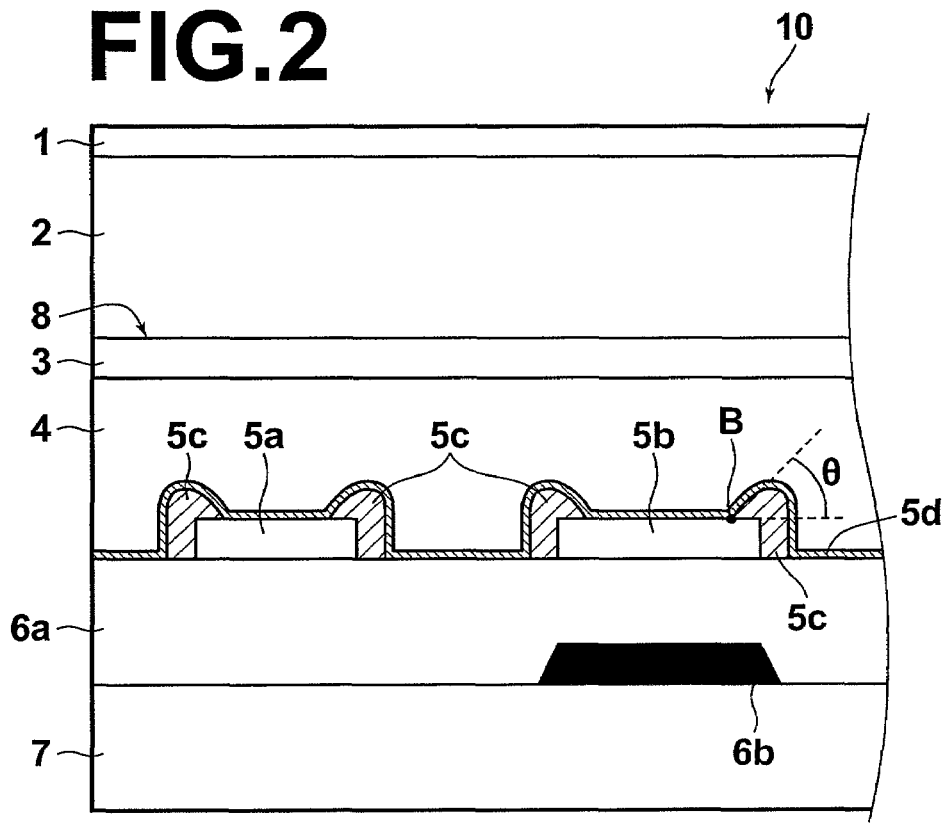
FIG. 2 is a sectional view of the radiation image detector illustrated in FIG. 1, taken along line A-A of FIG. 1.

Hereinafter, a first embodiment of the radiation image detector of the present invention will be described with reference to the attached drawings. FIG. 1 is a perspective view of a radiation image detector 10 according to a first embodiment of the present invention, and FIG. 2 is a sectional view of the radiation image detector 10 taken along line A-A of FIG. 1. Note that FIG. 1 and FIG. 2 schematically illustrate the structure of each layer, and the thickness and width of each layer are not drawn accurately to scale.

The radiation image detector 10 is of the type that employs the optical readout method. The radiation image detector 10 comprises; a first electrode layer 1 that transmits recording electromagnetic waves which have passed through a subject and bear image information, such as X-rays; a recording photoconductive layer 2 that generates charges and exhibits conductivity when irradiated by the recording electromagnetic waves transmitted through the first electrode layer 1; a charge transport layer 3, which functions as an insulator with respect to electric charges which are accumulated during recording of the image information (accumulated electric charges) and as a conductor with respect to electric charges of a polarity opposite that of the accumulated electric charges, from among the electric charges generated by the recording photoconductive layer 2; a readout photoconductive layer 4 that generates charges when irradiated by readout light; a second electrode layer 5 having a plurality of first linear electrodes 5a and a plurality of second linear electrodes 5b for detecting signals corresponding to the charges generated in the recording photoconductive layer 2; a transparent insulating layer 6a which is insulative and is transmissive with respect to the readout light; and a substrate 7, which is transmissive with respect to the readout light; stacked in this order.

Further, the interface between the recording photoconductive layer 2 and the charge transport layer 3 functions as an accumulating section 8, at which electric charges generated within the recording photoconductive layer 2 that bear a radiation image are accumulated. Note that the above layers are formed on the substrate 7, which is a glass plate that transmits the readout light or the like, starting with the transparent insulating layer 6a.

As a characteristic feature of the radiation image detector 10, dielectrics 5c are provided at the edges of the first linear electrodes 5a and the second linear electrodes 5b. In addition, a charge injection preventing layer 5d is provided at the interfaces between the readout photoconductive layer 4 and the first linear electrodes 5a, the readout photoconductive layer 4 and the second linear electrodes 5b, and the readout photoconductive layer 4 and the dielectrics 5c. The dielectrics 5c and the charge injection preventing layer 5d will be described in detail later.

The size (area) of the radiation image detector 10 is 18 cm by 18 cm or greater, for example, with an effective size of 43 cm by 43 cm in the case that the radiation image detector 10 is to be used for chest X-rays.

The first electrode layer 1 may be formed by any material as long as it transmits radiation, and thin metal films are preferred examples. Examples of such materials include: Au; Ni; Cr; Pt; Ti; Al; Cu; Pd; Ag; Mg; 3 to 20% MgAg alloys; Mg—Ag intermetallic compounds; 3 to 20% MgCu alloys; and Mg—Cu intermetallic compounds.

Au, Pt, and Mg—Ag intermetallic compounds are particularly favorable for use as the material of the first electrode layer 1. In the case that Au is used, for example, the thickness of the first electrode layer 1 is preferably within a range of 15 nm to 200 nm, and more preferably within a range of 30 nm to 100 nm. In the case that 3 to 20% Mg—Ag alloys are used, the thickness of the first electrode layer 1 is preferably within a range of 100 nm to 400 nm. An example of a method by which the first electrode layer 1 may be formed is vapor deposition by electrical resistance heating. Alternatively, the first electrode layer 1 may be formed by any desired method.

The recording photoconductive layer 2 is formed by a material that generates electric charges by being irradiated with radiation. A compound having at least one of: an amorphous selenium compound; $Bi_2MO_{20}$ (M: Ti, Si, Ge); $Bi_4M_3O_{12}$ (M: Ti, Si, Ge); $Bi_2O_3$, $BiMO_4$ (M:Nb, Ta, V); $Bi_2WO_6$; $Bi_{24}B_2O_{39}$; ZnO; ZnS; ZnSe; ZnTe; $MnbO_3$ (M: Li, Na, K); PbO; $HgI_2$; $PbI_2$; CdS; CdSe; CdTe; $BiI_3$; and GaAs as a main component may be used as the material for the recording photoconductive layer 2. Among these, it is preferable to use an amorphous selenium compound, which has a comparatively high quantum efficiency with respect to radiation and high dark resistance.

In the case that an amorphous selenium compound is employed as the material of the recording photoconductive layer 2, the layer may be doped with; an alkali metal such as Li, Na, K, Cs, and Rb, at a concentration within a range of 0.001 ppm to 1 ppm; a fluoride such as LiF, NaF, KF, CsF, and RbF, at a concentration within a range of 0.1 ppm to 1000 ppm; F, As, Sb, and Ge at a concentration within a range of 50 ppm to 5000 ppm; As at a concentration within a range of 10 ppm to 5000 ppm; or Cl, Br, and I at a concentration within a range of 1 ppm to 10 ppm. It is particularly preferable to use amorphous selenium doped with As at a concentration within a range of 10 ppm to 200 ppm; amorphous selenium containing As within a range of 0.2% to 1% and doped with Cl at a concentration within a range of 5 ppm to 100 ppm; or amorphous selenium containing As at a concentration within a range of 0.2% to 1% and doped with an alkali metal at a concentration within a range of 0.001 ppm to 1 ppm.

Amorphous selenium that contains fine photoconductive particles, such as: $Bi_2MO_{20}$ (M: Ti, Si, Ge); $Bi_4M_3O_{12}$ (M: Ti, Si, Ge); $Bi_2O_3$; $BiMO_4$ (M:Nb, Ta, V); $Bi_2WO_6$; $Bi_{24}B_2O_{39}$; ZnO; ZnS; ZnSe; ZnTe; $MnbO_3$ (M: Li, Na, K); PbO; $HgI_2$; $PbI_2$; CdS; CdSe; CdTe; $BiI_3$; and GaAs; at particle sizes from several nm's to several μm's may also be employed.

The thickness of the recording photoconductive layer 2 is preferably within a range of 100 μm to 2000 μm in the case that an amorphous selenium compound is used as the material. It is particularly preferable for the thickness of the photoconductive layer 2 to be within a range of 150 μm to 250 μm in the case that the radiation image detector 10 is used for mammography, and to be within a range of 500 μm to 1200 μm in the case that the radiation image detector 10 is used for other purposes.

The charge transport layer 3 may be formed by any material, as long as it is insulative with respect to electric charges of a polarity which is desired to be accumulated, and conductive with respect to electric charges of the opposite polarity. In the material, it is preferable for a difference of $10^3$ or greater to be present between the products of motility and life of charges of the two polarities. Examples of materials for the charge transport layer 3 include sulfides, such as: $As_2S_3$; $Sb_2S_3$; and ZnS; oxides, and fluorides. Examples of preferred compounds include; $As_2Se_3$; $As_2Se_3$ doped with Cl, Br, and I at a concentration within a range of 500 ppm to 2000 ppm; $As_2Se_3$ in which up to 50% of Se is replaced with S; $As_2Se_3$ in which the concentration of As is varied ±15%; and amorphous Se—Te, in which the concentration of Te is within a range of 5 wt % to 30 wt %.

In the case that materials containing the aforementioned chalcogenides are employed, it is preferable for the thickness of the charge transport layer 3 to be within a range of 0.4 μm to 3.0 μm, and more preferably within a range of 0.5 μm to 2.0 μm. The charge transport layer 3 may be formed by a single film forming operation, or by a plurality of film forming operations.

Preferred organic films for the charge transport layer 3 include polymers such as: acrylic organic resins; polyimides; BCB; PVA; acrylics; polyethylenes; polycarbonates; and polyether imides, doped with charge transporting materials. The charge transporting materials may be selected from among molecules of: tris(8-quinolinolato) aluminum ($Alq_3$); N,N'-diphenyl-N,N'-di(m-tolyl) benzene (TPD); polyparaphenylene vinylene (PPV); polyalkyl thiophene; polyvinyl carbazole (PVK); metallic phthalocyanine; (4-dicyano methylene)-2-methyl-6-(p-dimethyl aminostyryl)-4H-pyrane (DCM); liquid crystal molecules; hexapentiroxy triphenylene; discotic liquid crystals having central cores that contain n conjugated condensed rings or transition metals; carbon nanotubes; and fullerenes. The amount of molecules to be doped can be set within a range of 0.1 wt % to 50 wt %.

The readout photoconductive layer 4 is formed by a photoconductive substance that exhibits conductivity when irradiated with readout light. The substance is preferably a semiconductor having an energy gap within a range of 0.7 eV to 2.5 eV, such as: an amorphous selenium compound; amorphous Si:H; crystal Si; and GaAs. Amorphous selenium is particularly preferred.

In the case that an amorphous selenium compound is employed as the material of the readout photoconductive layer 4, the layer may be doped with: an alkali metal such as Li, Na, K, Cs, and Rb, at a concentration within a range of 0.001 ppm to 1 ppm; a fluoride such as LiF, NaF, KF, CsF, and RbF, at a concentration within a range of 10 ppm to 10000 ppm; P, As, Sb, and Ge at a concentration within a range of 500 ppm to 5000 ppm; As at a concentration within a range of 10 ppm to 5000 ppm; or Cl, Br, and I at a concentration within a range of 1 ppm to 100 ppm. It is particularly preferable to use amorphous selenium doped with. As at a concentration within a range of 10 ppm to 200 ppm; amorphous selenium containing As within a range of 0.2% to 1% and doped with Cl at a concentration within a range of 5 ppm to 100 ppm; or amorphous selenium containing As at a concentration within a range of 0.2% to 1% and doped with an alkali metal at a concentration within a range of 0.001 ppm to 1 ppm.

The readout photoconductive layer 4 is to be of a thickness that enables sufficient absorption of the readout light, while also enabling charges generated therein by irradiation of the readout light to be drifted by the electrical fields formed by the charges accumulated in the accumulating section. The thickness of the readout photoconductive layer 4 is preferably within a range of 1 μm to 30 μm.

The first linear electrodes 5a and the second linear electrodes 5b are linear electrodes that extend in the vertical direction of FIG. 1. The first linear electrodes 5a and the second linear electrodes 5b are provided alternately and substantially parallel to each other, with predetermined intervals therebetween. The second linear electrodes 5b are configured to be shielded from the readout light by color filter layers 6b, to be described later. The first linear electrodes 5a are charge pair generating electrodes, and the second linear electrodes 5b are charge pair non generating electrodes. That is, a configuration is adopted such that charge pairs for signal readout are not generated in the readout photoconductive layer 4 at positions corresponding to the second linear electrodes 5b. Here, the second electrode layer 5 is constituted by linear electrodes so as to facilitate correction of structural noise, to improve the S/N ratio of images by reducing the amount of data, and to shorten readout time by enabling parallel readout (mainly in a main scanning direction).

The first linear electrodes 5a and the second linear electrodes 5b may be formed by any material, as long as the material is transmissive with respect to the readout light and is conductive. In addition, it is necessary to secure flatness in order to avoid damage due to electrical field concentration during application of high voltage. Examples of materials for the first linear electrodes 5a and the second linear electrodes 5b include ITO and IZO, at a thickness within a range of 0.1 μm to 1 μm. Alternatively, the first linear electrodes 5a and the second linear electrodes 5b may be formed by metals such as Al and Cr, at thicknesses that transmit the readout light (for example, approximately 10 nm).

The dielectrics 5c are provided at the edges of the first linear electrodes 5a and the second linear electrodes 5b, along the longitudinal directions thereof. Here, the "edges" refer to the side surfaces and portions of surfaces of the linear electrodes, which are continuous with the side surfaces, that face the recording photoconductive layer 2, as illustrated in FIG. 1 and FIG. 2. Providing the dielectrics 5c at the edges of the linear electrodes, where electrical fields are likely to be concentrated, enables reductions in the amounts of charges injected into the electrodes from the edges thereof, which in turn suppresses the occurrence of image faults.

The dielectrics 5c may be formed by any material as long as it is insulative. The dielectrics 5c may be formed by a material which is either transmissive or opaque with respect to the readout light. Examples of materials for the dielectrics 5c include: novolac resin; acrylic resin; PVA (polyvinyl alcohol) film; PVP (polyvinyl pyrrolidone) film; and PAA (polyacrylic acid) film. The dielectrics 5c are preferably of a sufficient thickness to prevent charge injection, and may have thicknesses within a range of 0.05 μm to 5 μm.

As another characteristic feature of the radiation image detector 10, the charge injection preventing layer 5d is provided at the interfaces between the readout photoconductive layer 4 and the surfaces of the first linear electrodes 5a not covered by the dielectrics 5c, the readout photoconductive layer 4 and the surfaces of the second linear electrodes 5b not covered by the dielectrics 5c, and the readout photoconductive layer 4 and the dielectrics 5c. The charge injection preventing layer 5d functions as a conductor with respect to electric charges of the same polarity as the electric charges which are accumulated during recording of the image information, and functions as an insulator with respect to electric charges of the opposite polarity from the accumulated electric charges. By providing the charge injection preventing layer 5d, charge transport properties can be secured for electric charges of the same polarity as the accumulated electric charges. At the same time, electric charges, which are charged in the first linear electrodes 5a and the second linear electrodes 5b and are of the polarity opposite that of the accumulated electric charges, can be prevented from leaking into the readout photoconductive layer 4. Accordingly, high sensitivity and favorable residual image characteristics can be maintained.

In the case that the accumulated electric charges are negative charges, the charge injection preventing layer 5d may be formed by an inorganic film having a thickness within a range of 0.01 μm to 0.05 μm. Examples of the inorganic film include; $CeO_2$ film; $Ta_2O_5$ film; $Al_2O_3$ film; ZnS film, MgO film, $GeO_2$ film; and $SiO_2$ film. Alternatively, the charge injection preventing layer 5d may be formed by an organic polymer film. Low molecular weight electron transport materials may be mixed into insulative polymers, such as polycarbonate, polystyrene, polyimide, and polycycloolefin. Preferred examples of the low molecular weight electron transport materials include: trinitrofluorenone and derivatives thereof; dipheno quinone derivatives; bis naphthyl quinine derivatives; oxazole derivatives; triazole derivatives; and carbon clusters, such as fullerene-$C_{60}$ and fullerene-$C_{70}$. Specific examples include; TNF (2,4,7-trinitrofluorene); DMDB (3,3'-dimethyl-5,5'-di-tert-butyl-4,4'-dipheno quinone); PBD (2-(4-biphenyl)-5-(4-tert-butyl phenyl)-1,3,4-oxadiazole); TAZ (2-(4-tert-butyl phenyl)-5-(4-biphenyl)-1,3,4-triazole; and $C_{60}$.

The organic film may be formed by dissolving the materials into an organic solvent, such as chlorobenzene, dichloro benzene, and tetrahydrofuran. The solution is coated, then dried. Any known coating method, such as the dip method, the ink jet method, and the spray method may be employed. The ink jet method is particularly preferable, from the viewpoint of controlling the coated region. The thickness of the organic film is preferably within a range from 0.05 μm to 0.5 μm In the case that the accumulated electric charges are positive charges, an amorphous layer having $Sb_2S_3$, $As_2S_3$; and $As_2Se_3$ as its main components may be employed as the charge injection preventing layer 5d. Here, the "amorphous layer having $Sb_2S_3$, $As_2S_3$, and $As_2Se_3$ as its main components" refers to an amorphous layer formed by $Sb_2S_3$, $As_2S_3$, and $As_2Se_3$; a layer of material in an amorphous state, in which a portion (less than 50%) of the anions of each of the aforementioned substances are replaced with another anion (S and Se, interchangeably); a layer of material in an amorphous state, in which a portion of the cations of each of the aforementioned substances are replaced with another cation (Sb and As, interchangeably); or a layer of material in an amorphous state, in which portions of the anions and cations are both replaced by other anions and cations.

The charge injection preventing layer 5d may alternatively be formed by an organic polymer film. A polymer positive hole transport material, such as PVK, which includes pendant portion having a charge transport base, may be employed as the organic polymer film. Alternatively, low molecular weight positive hole transport materials may be mixed into insulative polymers, such as polycarbonate, polystyrene, polyimide, and polycycloolefin. Preferred examples of the low molecular weight positive hole transport materials include: oxazole derivatives; triphenyl methane derivatives; hydrazone derivatives; and triphenyl amine derivatives Specific examples include: NPD (N,N'-di(1-naphthyl)-N,N'-diphenyl-1,1'-diphenyl-4,4'-diamine); TPD (N—N'-diphenyl-N,N'-bis(m-tolyl)benzidine); PDA (N,N,N',N'-tetrakis (m-methyl phenyl)-1,3-diamino benzene); m-MTDATA (4,4',4"-tris[3-methyl phenyl(phenyl)amino]triphenyl amine); 2-TNATA (4,4',4"-tris(N-(2-naphthyl)-N-phenyl-amino)-triphenyl amine); and TPAC (1,1-bis[4-(N,N-di(p-tolyl)amino)phenyl]cyclohexane).

The aforementioned electron transport materials and positive hole transport materials function as charge transport materials. Among the charge transport materials described above, TNF, DMDB, TAZ, $C_{60}$, TPD, m-MTDATA (4,4',4"-tris[3-methyl phenyl(phenyl)amino]triphenyl amine), 2-TNATA, and TPAC have the structure illustrated in FIG. 7.

In the case that NPD, TPD, $C_{60}$, or carbon nanotubes are employed as the charge transport material, the charge transport material may be mixed into the organic polymer film at a concentration within a range of 0.5 wt % to 80 wt %, and preferably at a concentration within a range of 0.5 wt % to 50 wt %. In the case that an organic film containing a charge transport material is used as the material of the charge injection preventing layer 5d, the charge transport properties can be more finely adjusted compared to cases in which an inorganic film is used. Accordingly, use of an organic film containing a charge transport material is advantageous in that the sensitivity and the residual image characteristics can be optimized.

Note that it is preferable for the dielectrics 5c to be of a thickness that can sufficiently prevent electric charge injection due to electrical field concentration into the linear electrodes 5a and 5b. It is preferable for the charge injection preventing layer 5d to be of the minimum thickness capable of preventing injection of electric charges having a polarity opposite that of the accumulated charges into the readout photoconductive layer, and a thinness that does not deteriorate the motility of electric charges having the same polarity as that of the accumulated charges. This is because motility of electric charges is generally poor through the charge injection preventing layer, and if the charge injection preventing layer is formed to be thick, sensitivity and residual image characteristics, which are the basic performance features of the radiation image detector, will deteriorate.

If the charge injection preventing layer 5d is formed thin, cracks are likely to occur. For this reason, it is preferable for the angle θ formed by the interfaces between the dielectrics 5c and the surfaces of the first linear electrodes 5a that face the recording photoconductive layer 2 and the interfaces between the dielectrics 5c and the charge injection preventing layer 5d to be within a range of 5 to 45 degrees. Hereinafter, this angle θ will be referred to as a "contact angle θ". Note that when considering the contact angle θ, the interfaces as illustrated in the sectional view of FIG. 2, for example, are approximated by lines, and the angles formed by the lines are designated as the contact angle θ. However, there may be cases in which it is difficult to approximate the interface between the charge injection preventing layer 5d and the dielectrics 5c with lines. In these cases, a line tangent to a contact point B between a dielectric 5c and a first linear electrode 5a may be used instead of the approximate line. The aforementioned contact angle θ has been described for dielectrics 5c which are provided at the edges of the first linear electrodes 5a. However, the same restriction and definition applies to the dielectrics 5c which are provided at the edges of the second linear electrodes 5b as well.

As illustrated in FIG. 2, the dielectrics 5c are provided at the edges of the electrodes with the contact angle θ so as to smoothly cover the surfaces of the electrodes without any steps being formed. Thereby, cracking of the thin charge injection preventing layer 5d can be prevented, and the effects thereof can be stably obtained. Note that if the contact angle θ is less than 5 degrees, it becomes difficult to manufacture the dielectrics 5c in the manner described above. If the contact angle θ exceeds 45 degrees, cracks in the charge injection preventing layer 5d become likely to occur at regions above the dielectrics 5c.

Figure 3:
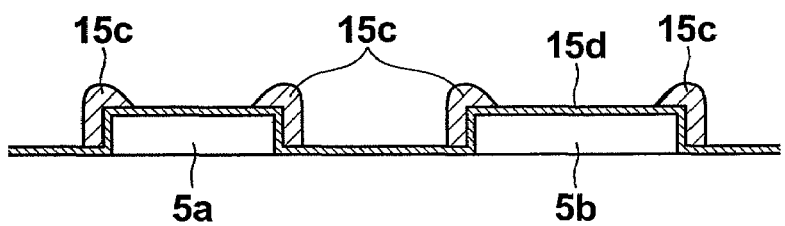
FIG. 3 illustrates a modification to the radiation image detector according to the first embodiment.
Figure 4:
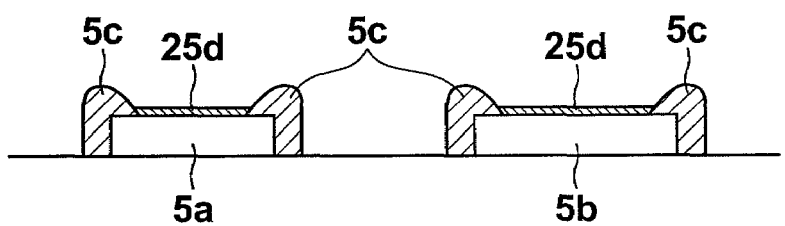
FIG. 4 illustrates another modification to the radiation image detector according to the first embodiment.

Note that in the example illustrated in FIG. 1 and FIG. 2, the first linear electrodes 5a, the second linear electrodes 5b, the dielectrics 5c, and the charge injection preventing layer 5d are stacked in this order. However, the present invention is not limited to this configuration. For example, the first linear electrodes 5a and the second linear electrodes 5b may be covered by a charge injection preventing layer 15d, then dielectrics 15c may be provided to cover the edges of the first linear electrodes 5a and the second linear electrodes 5b, as illustrated in FIG. 3. As another alternative, the edges of the first linear electrodes 5a and the second linear electrodes 5b may be covered by the dielectrics 5c, and then only the surfaces thereof that face the recording photoconductive layer 2 which are not covered by the dielectrics 5c may be covered by charge injection preventing layers 25d, as illustrated in FIG. 4. Radiation image detectors having the configurations as illustrated in FIG. 3 and FIG. 4 suppress image faults while maintaining favorable sensitivity and residual image characteristics, similarly to that illustrated in FIG. 2. Note that in FIG. 3 and FIG. 4, other components of the radiation image detectors have been omitted, to more clearly illustrate the configuration of the dielectrics and the charge injection preventing layers.

The transparent insulative layer 6a is insulative and transmissive with respect to the readout light. An acrylic resin may be employed as the material of the transparent insulative layer 6a. It is desirable for the thickness of the transparent insulative layer 6a to be approximately 1 µm or less.

The color filter layers 6b are provided at portions of the transparent insulative layer 6a corresponding to the second linear electrodes 5b. The color filter layers 6b are opaque with respect to the readout light. Examples of materials for the color filter layers 6b include: metals, such as Al, Mo, and Cr; and organic materials, such as $MoS_2$, $Wsi_2$, and TiN. The widths of the color filter layers 6b may be 30 µm, for example.

Because the color filter layers 6b prevent the readout light from entering the second linear electrodes 5b, charge pairs for signal readout are not generated in the readout photoconductive layer 4 at positions corresponding to the second linear electrodes 5b.

The substrate 7 may be formed by any material, as long as it is transmissive with respect to the readout light. Examples of such materials include glass and organic polymers.

Next, an example of the operation of the radiation image detector 10 will be described. In the following example, negative electric charges are charged in the first electrode layer 1, and positive electric charges are charged in the second electrode layer 5. Negative electric charges are accumulated at the accumulating section 8, which is formed at the interface between the recording photoconductive layer 2 and the charge transport layer 3. The charge transport layer 3 functions as a positive hole transport layer, through which positive electric charges, that is, electric charges having a polarity opposite the accumulated electric charges, have a greater motility than negative electric charges, that is, the accumulated electric charges. The charge injection preventing layer 5d functions as a conductor with respect to negative electric charges, and as an insulator with respect to positive electric charges. However, the polarities of the electric charges may be reversed. In the case that the polarities are reversed, the only changes which are necessary are to change the charge transport layer that functions as a positive hole transport layer to an electron transport layer, and to change the charge injection preventing layer 5d to that which is conductive with respect to positive electric charges and insulative with respect to negative electric charges.

First, a high voltage source applies a negative biasing voltage to the first electrode layer 1 of the radiation image detector 10, to form an electrical field between the first electrode layer 1 and the second electrode layer 5. When the electrical field is formed, positive electric charges are charged in the first linear electrodes 5a and the second linear electrodes 5b of the second electrode layer 5. Radiation is irradiated from a radiation source, such as an X-ray source, onto a subject in this state. The radiation, which has passed through the subject and bears a radiation image thereof, is irradiated onto the radiation image detector 10 from the side of the first electrode layer 1.

The radiation passes through the first electrode layer 1 and is irradiated onto the recording photoconductive layer 2. Thereby, charge pairs corresponding to the amount of radiation are generated in the recording photoconductive layer 2 (refer to FIG. 5A). Among the generated charge pairs, positive electric charges (positive holes) move toward the first electrode layer 1, combine with the negative charges which have been injected by the high voltage source, and disappear. Meanwhile, negative electric charges (electrons) from among the generated charge pairs move toward the second electrode layer 5 along the electrical field distribution formed by the application of the biasing voltage. The electrons are accumulated as latent image charges in the accumulating section 8 at the interface between the charge transfer layer 3 and the recording photoconductive layer 2 (refer to FIG. 5B). The amount of the latent image charges is substantially proportionate to the dosage of the irradiated radiation, and represents the radiation image.

When the electrical field is formed, if the edges of the first linear electrodes 5a and the second linear electrodes 5b are not covered by the dielectrics 5c, the electrical fields will become concentrated at these edges, and charge injection will occur However, the amount of injected charges can be reduced and image faults can be suppressed in the radiation image detector 10 of the present embodiment, because the dielectrics 5c are provided.

When the radiation image which has been recorded in the radiation image detector 10 is read out, readout light is irradiated from the side of the substrate 7 in a state in which the first electrode layer 1 is grounded. The readout light, which is linear and extends in a direction perpendicular to the longitudinal direction of the linear electrodes of the second electrode layer 5, is scanned across the entire surface of the radiation image detector 10 in the longitudinal direction of the linear electrodes 5. The irradiation of the readout light causes charge pairs to be generated in the readout photoconductive layer 4 at positions corresponding to the scanning positions of the readout light (refer to FIG. 5C). Note that the generation of charge pairs does not occur in portions of the readout photoconductive layer 4 that correspond to the second linear electrodes 5b, because the color filter layers 6b shield these portions from the readout light.

Figure 5A:
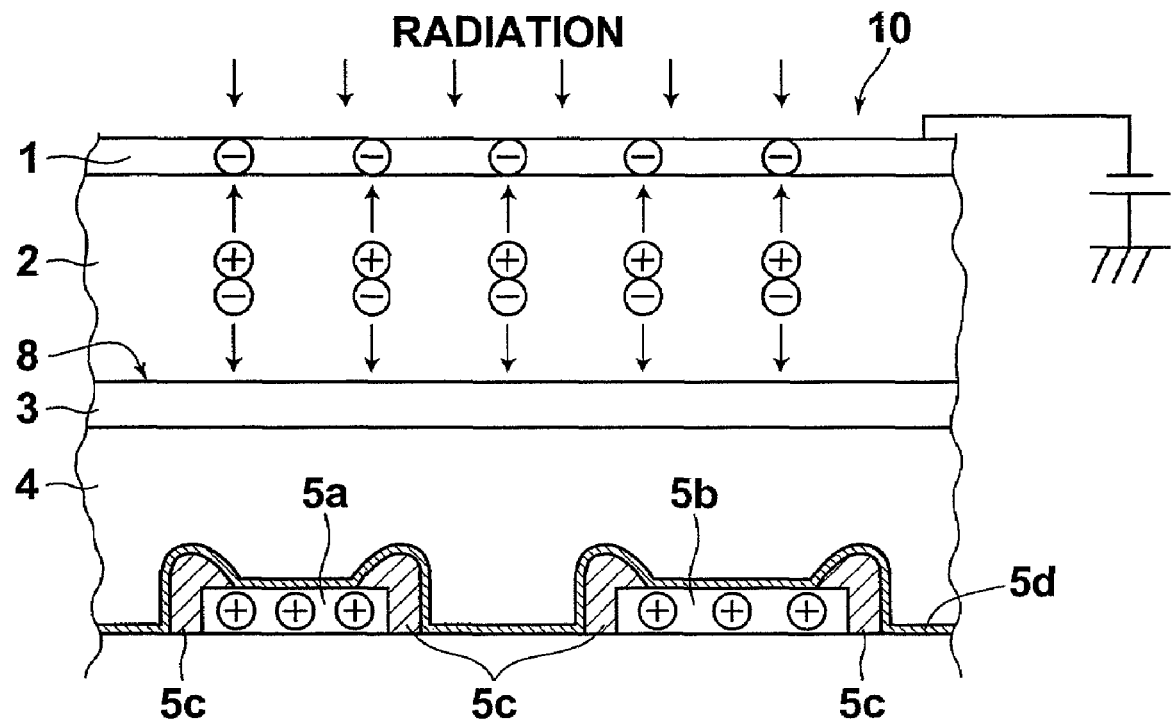
FIG. 5A is a first diagram for explaining an operation for recording a radiation image in the radiation image detector of FIG. 1.
Figure 5B:
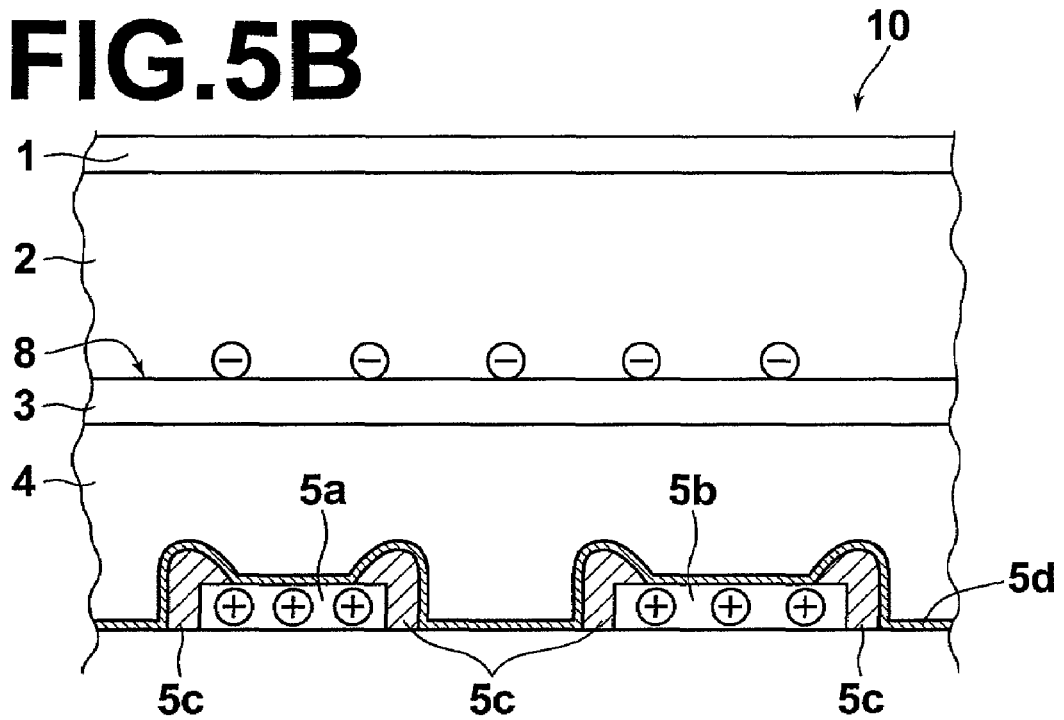
FIG. 5B is a second diagram for explaining the operation for recording a radiation image in the radiation image detector of FIG. 1.

Note also that the transparent insulative layer 6a, the color filter layers 6b, and the substrate 7 are omitted from FIG. 5A and FIG. 5B. The substrate 7 is omitted from FIG. 5c. The readout light is irradiated from below the substrate 7.

Positive charges from among the generated charge pairs move toward the latent image charges at the accumulating section 8, combine with the latent image charges, and disappear. Meanwhile, negative charges from among the charge pairs move toward the positive charges which are charged in the first linear electrodes 5a of the second electrode layer 5, combine with the positive charges, and disappear.

In the radiation image detector 10, the charge injection preventing layer 5d increases the transport properties of negative charges, to facilitate movement of the negative charges to the first linear electrodes 5a. At the same time, the positive charges which are charged in the first linear electrodes 5a are prevented from leaking into the readout photoconductive layer 4. Therefore, favorable sensitivity and residual image characteristics can be maintained.

The above combinations of negative charges and positive charges cause electric currents i to flow through current detecting amplifiers (not shown). The currents are integrated and detected as image signals, to perform readout of image signals corresponding to the radiation image.

Next, Examples of the radiation image detector 10 having the aforementioned construction and Comparative Examples will be described Table 1 lists the materials and thicknesses of the dielectrics 5c and the charge injection preventing layers 5d of radiation image detectors constructed according to the first embodiment. Table 2 lists the materials and thicknesses of either dielectrics or charge injection preventing layers of radiation image detectors according to the Comparative Examples, which are provided with only the dielectrics or only the charge injection preventing layers. The leftmost column in both Table 1 and Table 2 indicate identification numbers for the Examples and the Comparative Examples.

TABLE 1

| Example Number | Charge Injection Preventing Layer | | Dielectrics | |
| --- | --- | --- | --- | --- |
| | Material | Thickness | Material | Thickness |
| E1 | $SiO_2$ | 0.01 μm | Novolac Resin | 0.8 μm |
| E2 | $Ta_2O_5$ | 0.01 μm | Novolac Resin | 0.8 μm |
| E3 | $Ta_2O_5$ | 0.015 μm | Novolac Resin | 0.8 μm |
| E4 | $Ta_2O_5$ | 0.03 μm | Novolac Resin | 0.8 μm |
| E5 | $Al_2O_3$ | 0.01 μm | Novolac Resin | 0.8 μm |
| E6 | ZnS | 0.015 μm | Novolac Resin | 0.8 μm |
| E7 | ZnS | 0.03 μm | Novolac Resin | 0.8 μm |
| E8 | MgO | 0.01 μm | Novolac Resin | 0.8 μm |
| E9 | $GeO_2$ | 0.01 μm | Novolac Resin | 0.8 μm |
| E10 | $GeO_2$ | 0.03 μm | Novolac Resin | 0.8 μm |
| E11 | $CeO_2$ | 0.005 μm | Novolac Resin | 0.8 μm |
| E12 | $CeO_2$ | 0.01 μm | Novolac Resin | 0.8 μm |
| E13 | $CeO_2$ | 0.015 μm | Novolac Resin | 0.8 μm |
| E14 | $CeO_2$ | 0.02 μm | Novolac Resin | 0.8 μm |
| E15 | $CeO_2$ | 0.025 μm | Novolac Resin | 0.8 μm |
| E16 | PC:C60 | 0.005 μm | Novolac Resin | 0.8 μm |
| E17 | PC:NPD | 0.005 μm | Novolac Resin | 0.8 μm |
| E18 | PC:TPD | 0.005 μm | Novolac Resin | 0.8 μm |

TABLE 2

| Comparative Example Number | Charge Injection Preventing Layer | | Dielectrics | |
| --- | --- | --- | --- | --- |
| | Material | Thickness | Material | Thickness |
| C1 | None | — | Novolac Resin | 0.8 μm |
| C2 | $SiO_2$ | 0.01 μm | None | — |
| C3 | $SiO_2$ | 0.03 μm | None | — |
| C4 | $SiO_2$ | 0.1 μm | None | — |
| C5 | $Ta_2O_5$ | 0.01 μm | None | — |
| C6 | $Ta_2O_5$ | 0.03 μm | None | — |
| C7 | $Ta_2O_5$ | 0.1 μm | None | — |
| C8 | $Al_2O_3$ | 0.01 μm | None | — |
| C9 | $Al_2O_3$ | 0.03 μm | None | — |
| C10 | $Al_2O_3$ | 0.1 μm | None | — |
| C11 | ZnS | 0.01 μm | None | — |
| C12 | ZnS | 0.03 μm | None | — |

TABLE 2-continued

| Comparative Example Number | Charge Injection Preventing Layer | | Dielectrics | |
|---|---|---|---|---|
| | Material | Thickness | Material | Thickness |
| C13 | ZnS | 0.1 μm | None | — |
| C14 | MgO | 0.01 μm | None | — |
| C15 | MgO | 0.03 μm | None | — |
| C16 | MgO | 0.1 μm | None | — |
| C17 | $GeO_2$ | 0.01 μm | None | — |
| C18 | $GeO_2$ | 0.03 μm | None | — |
| C19 | $GeO_2$ | 0.1 μm | None | — |
| C20 | $CeO_2$ | 0.01 μm | None | — |
| C21 | $CeO_2$ | 0.03 μm | None | — |
| C22 | $CeO_2$ | 0.1 μm | None | — |
| C23 | PC:C60 | 0.05 μm | None | — |
| C24 | PC:NPD | 0.05 μm | None | — |
| C25 | PC:TPD | 0.05 μm | None | — |

Image faults, sensitivity, and residual image characteristics of the Examples and the Comparative Examples were evaluated. The radiation image detectors of Examples E1 through E10 in Table 1 employed 0.8 μm thick novolac resin as the dielectrics 5c, and inorganic films as the charge injection preventing layers 5d. In these radiation image detectors, the number of initial image faults was 200 or less in an imaging area, which is a drastic reduction. In addition, the faults did not increase or become enlarged after 50,000 high dosage irradiations, that is, sufficient durability was obtained.

The radiation image detectors of Examples E11 through E15 in Table 1 employed 0.8 μm thick novolac resin as the dielectrics 5c, and $CeO_2$ at various thicknesses as the charge injection preventing layers 5d. In these radiation image detectors, the number of initial image faults was equivalent to that of Examples E1 through E10. In addition, the faults did not increase or become enlarged after 50,000 high dosage irradiations, that is, sufficient durability was obtained. Further, in cases that negative voltage was applied to the first electrode layers 1, deterioration of residual image properties due to the electron transport characteristics were not observed.

The radiation image detectors of Examples E16 through E18 in Table 1 employed 0.8 μm thick novolac resin as the dielectrics 5c, and organic films containing the charge transport materials listed in Table 1 as the charge injection preventing layers 5d. The compositional ratio of PC:$C_{60}$ in Example E16 is 70:30 (wt %). Note that here, bis phenol A-polycarbonate (PC) was employed as a type of polycarbonate. The compositional ratios of the charge transport materials in Examples E17 and E18 are both 5 wt %. In these radiation image detectors, favorable results similar to those obtained by Examples E1 through E10 were obtained. Note Examples E1 through E16 are those in which negative biasing voltages are applied to the first electrode layers 1, and Examples E17 and E18 are those in which positive biasing voltages are applied to the first electrode layers 1.

In the radiation image detector of Comparative Example C1 of Table 2, the dielectrics 5c were provided at the edges of the first linear electrodes 5a and the second linear electrodes 5b, but a charge injection preventing layer 5d was not provided. In this Comparative Example, the number of initial image faults was 500 or less in an imaging area. However, a large amount of injected current flowed through the radiation image detector over 50,000 repeated high dosage irradiations, because there was an insufficient blocking function with respect to positive holes. As a result, the image faults increased to sizes up to 10×10 pixels (100 pixels), and sufficient durability was not obtained.

In the radiation image detectors of Comparative Examples C2 through C25 of Table 2, charge injection preventing layers 5d were provided, but the dielectrics 5c were not provided. The compositional ratios of the charge transport materials in Examples C23 through C25 are the same as those in Examples E16 through E18, respectively. As a result, in this Comparative Examples, there were many portions which were insufficiently covered by the 0.0 μm thick charge injection preventing layers 5d, and a great number of initial image faults were observed. Even when the film thicknesses were increased to 0.03 μm and 0.1 μm, the number of initial image faults could not be reduced. In addition, decreased sensitivity and large sized residual images were observed, that is, the image quality deteriorated. Note Comparative Examples C1 through C23 are those in which negative biasing voltages are applied to the first electrode layers 1, and Comparative Examples C24 and C25 are those in which positive biasing voltages are applied to the first electrode layers 1.

Further, the detailed results of experiments which were conducted for cases in which the charge injection preventing layer was formed by organic materials that include PC are shown in Table 3 and Table 4. Table 3 lists materials, compositional ratios, thicknesses, and the number of faulty pixels, for Examples in which both of the dielectrics 5c and the charge injection preventing layers 5d are provided. Table 4 lists the materials, compositional ratios, thicknesses, and the number of faulty pixels, for Comparative Examples, in which either one of the dielectrics or the charge injection preventing layer is provided. The leftmost column in both Table 3 and Table 4 indicate identification numbers for the Examples and the Comparative Examples. The numbers of faulty pixels in Table 3 and Table 4 are initial values, and values after durability tests after high dosage irradiation is irradiated 50,000 times.

TABLE 3

| | Charge Injection Preventing Layer | | | Dielectric | | Faulty Pixels |
|---|---|---|---|---|---|---|
| Example Number | Material | Compositional Ratio (wt/wt) | Thickness (μm) | Material | Thickness (μm) | (Initial/After Durability Test) |
| E19 | PCZ:$C_{60}$ | 70:30 | 0.05 | Novolac Resin | 0.8 | 50/55 |
| E20 | PCZ:$C_{60}$ | 70:30 | 0.1 | Novolac Resin | 0.8 | 40/50 |
| E21 | PCZ:$C_{60}$ | 70:30 | 0.4 | Novolac Resin | 0.8 | 40/50 |
| E22 | PCZ:$C_{60}$ | 70:30 | 2.0 | Novolac Resin | 0.8 | 40/50 |
| E23 | PCZ:$C_{70}$ | 70:30 | 0.05 | Novolac Resin | 0.8 | 60/60 |
| E24 | PCZ:BCP | 40:60 | 0.05 | Novolac Resin | 0.8 | 65/80 |
| E25 | PCZ:DMDB | 50:50 | 0.05 | Novolac Resin | 0.8 | 70/75 |

TABLE 4

| Comparative Example Number | Charge Injection Preventing Layer | | | Dielectric | | Faulty Pixels (Initial/After Durability Test) |
|---|---|---|---|---|---|---|
| | Material | Compositional Ratio (wt/wt) | Thickness (μm) | Material | Thickness (μm) | |
| C26 | None | N/A | N/A | Novolac Resin | 0.8 | 200/600 |
| C27 | PCZ:$C_{60}$ | 70:30 | 0.1 | None | — | 400/500 |
| C28 | PCZ:$C_{60}$ | 70:30 | 2.0 | None | — | 200/250 |
| C29 | PCZ:BCP | 40:60 | 0.05 | None | — | 500/500 |
| C30 | PCZ:DMDB | 50:50 | 0.05 | None | — | 500/500 |

In the experiments of Table 3 and Table 4, cyclohexyl-polycarbonate is employed as a type of polycarbonate. Here, the cyclohexyl-polycarbonate is indicated as PCZ. Iupilon™ by Mitsubishi Gas Chemical K.K. was used as the cyclohexyl-polycarbonate. BCP, DMB, and $C_{60}$ used in the experiments of which the results are listed in Table 3 and Table 4 are shown below. The structure of the BCP and the cyclohexyl polycarbonate (PCZ) employed in the experiments of Table 3 and Table 4, as well as the structure of the bis phenol A-polycarbonate (PC) employed in the experiments of Table 1 and Table 2 are illustrated in FIG. 8.

$C_{60}$ fullerene $C_{60}$
BCP 2,9-dimethyl-4,7-diphenyl-1,10-phenanthroline
DMDB dimethyl-di-t-butyl-dipheno quinone Comparative Example C26 of Table 4 is of a structure in which only dielectrics are provided. After repeated irradiation of high dosage radiation, increases in the numbers and the sizes of faulty pixel portions were observed. Comparative Examples C27 and C28 of Table 4 are only provided with charge injection preventing layers. The residual image properties of these Comparative Examples were poor, indicating that decreases in image faults and favorable residual image properties cannot be realized simultaneously by providing only a charge injection preventing layer. Comparative Examples C29 and C30 of Table 4 have high numbers of image faults.

In contrast, Examples E19 through E25 of Table 3 exhibit generally favorable residual image properties, and the numbers of image faults are less than those of the Comparative Examples by an order of 10. It was seen that initial image faults and image faults after high dosage radiation irradiation can be effectively suppressed, without deteriorating residual image properties, by providing the charge injection preventing layer and the dielectrics, from the results of the experiments conducted using the radiation image detectors of Table 3 and Table 4.

Based on the results observed in the aforementioned Examples and the Comparative Examples, it can be understood that radiation image detectors having only one of the dielectrics 5c and the charge injection preventing layer 5d have problems with regard to durability and image quality. In other words, both the dielectrics 5c and the charge injection preventing layer 5d, as provided in the first embodiment of the present invention, are necessary.

Note that in the first embodiment described above, the radiation image detector 10 comprises the charge pair generating first linear electrodes 5a and the non charge pair generating second linear electrodes 5b, both of which are provided with the dielectrics 5c and the charge injection preventing layer 5d. In the case that two types of electrodes are provided, however, improvements in image faults, sensitivity, and residual image characteristics can be obtained by only providing one of the types of electrodes with the dielectrics 5c and the charge injection preventing layer 5d.

Figure 6:
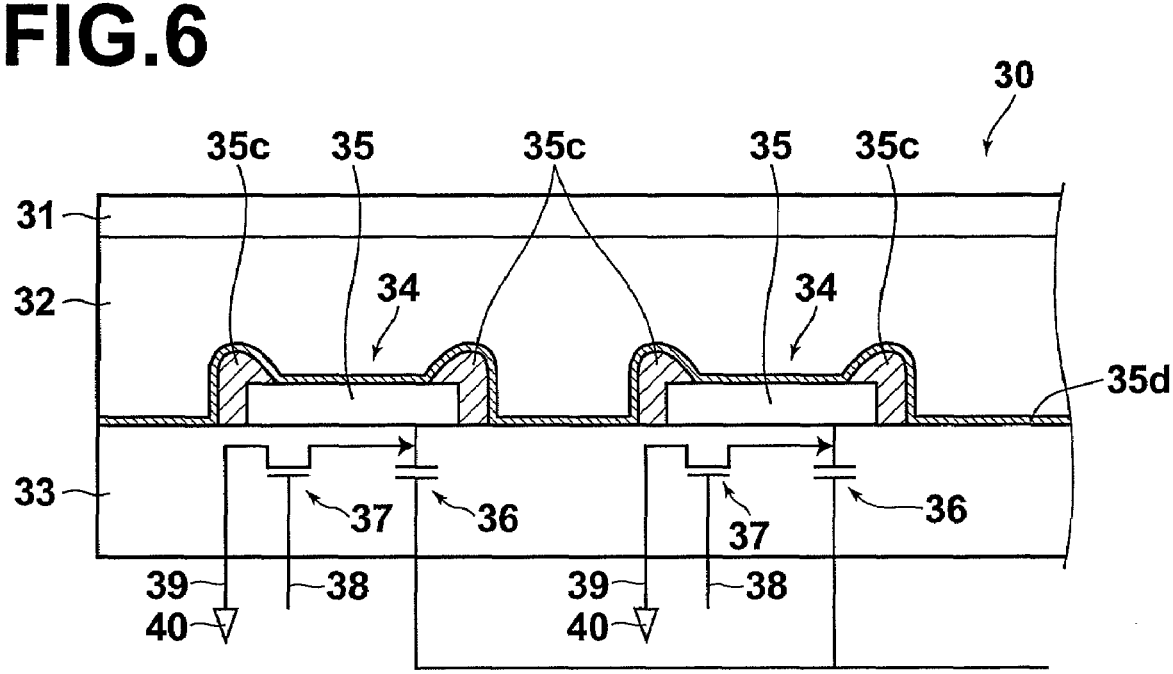
FIG. 6 is a diagram that schematically illustrates the construction of a radiation image detector according to a second embodiment of the present invention.

Next, a radiation image detector 30 according to a second embodiment of the present invention will be described. FIG. 6 is a schematic view that illustrates the construction of the radiation image detector 20.

The radiation image detector 30 of the second embodiment employs the electrical readout method. The radiation image detector 30 is formed by stacking: a first electrode layer 31 that transmits recording electromagnetic waves bearing radiation image information; a photoconductive layer 32 that generates charges when irradiated by the recording electromagnetic waves transmitted through the first electrode layer 31; and a plurality of pixel electrodes 35, which are detecting electrodes for detecting signals corresponding to the charges generated in the photoconductive layer 32; in this order, as illustrated in FIG. 6. Each of the pixel electrodes 35 is connected to an accumulating capacitor 36, for accumulating the electric charges collected by the pixel electrode 35, and a switching element 37. Each combination of the pixel electrode 35, the accumulating capacitor 36, and the switching element 37 constitutes a pixel portion 34. A charge detecting layer 33 is constituted by a great number of pixel portions 34, which are arranged two dimensionally.

The first electrode layer 31 is formed by a low resistance conductive material, such as Au. A high voltage source (not shown), for applying negative biasing voltage, is connected to the first electrode layer 31.

The photoconductive layer 32 has electromagnetic wave conductivity, and generates charges therein when irradiated by radiation. The photoconductive layer 22 may be a non crystalline a—Se film having selenium as its main component at a thickness of 100 μm to 1000 μm, for example.

The charge detecting layer 33 is constituted by an active matrix substrate, in which a great number of pixel portions 34 are arranged two dimensionally In addition to the aforementioned pixel electrodes 35 and the like, each pixel portion 34 is equipped with: a great number of scanning lines 38, for turning the switching element 37 ON/OFF; and a great number of data lines 39, for reading out the charges accumulated in the accumulating capacitor 36.

The pixel electrodes 35 collect signal charges corresponding to the electric charges generated in the photoconductive layer 32. The pixel electrodes 35 may be formed by 0.05 μm to 1 μm thick films made of Al, Au, Cr, ITO (Indium Tin Oxide), IZO (Indium Zinc Oxide) or the like.

As a characteristic feature of the radiation image detector 30, dielectrics 35c and a charge injection preventing layer 35d are provided between the pixel electrodes 35 and the photoconductive layer 32.

The dielectrics 35c cover the edges of the pixel electrodes 35. Here, the "edges" refer to the side surfaces and portions of surfaces of the pixel electrodes 35, which are continuous with the side surfaces, that face the photoconductive layer 32. Providing the dielectrics 35c at the edges of the pixel electrodes 35, where electrical fields are likely to be concentrated, enables reductions in the amounts of charges injected into the electrodes from the edges thereof, which in turn suppresses the occurrence of image faults.

The dielectrics 35c may be formed by any material as long as it is insulative. Materials similar to those of the dielectrics 5c of the first embodiment may be employed.

Note that it is preferable for the contact angle of the dielectrics 35c to be similar to the contact angle θ of the dielectrics 5c of the first embodiment, illustrated in FIG. 2. That is, it is preferable for the contact angle of the dielectrics 35c to be within a range of 5 degrees to 45 degrees. Note that if the contact angle is less than 5 degrees, it becomes difficult to manufacture the dielectrics 35c in the manner described above. If the contact angle θ exceeds 45 degrees, cracks in the charge injection preventing layer 35d become likely to occur at regions above the dielectrics 35c.

The charge injection preventing layer 35d of the second embodiment is provided to cover the entirety of the surfaces of the pixel electrodes 35 and the dielectrics 35c that face the photoconductive layer 32. The charge injection preventing layer 35d functions as a conductor with respect to electric charges of the same polarity as the electric charges which are accumulated during recording of the image information, and functions as an insulator with respect to electric charges of the opposite polarity from the accumulated electric charges. By providing the charge injection preventing layer 35d, charge transport properties can be secured for electric charges of the same polarity as the accumulated electric charges. At the same time, electric charges, which are charged in the pixel electrodes 35 and are of the polarity opposite that of the accumulated electric charges, can be prevented from being injected into the photoconductive layer 32. Accordingly, high sensitivity and favorable residual image characteristics can be maintained.

Materials similar to those employed for the charge injection preventing layer 5d of the first embodiment may be employed for the charge injection preventing layer 35d.

Next, an example of the operation of the radiation image detector 30 will be described. The high voltage source applies a biasing voltage to the first electrode layer 31 of the radiation image detector 30, to form an electrical field between the first electrode layer 31 and the pixel electrodes 35. Radiation is irradiated from a radiation source, such as an X-ray source, onto a subject in this state. The radiation, which has passed through the subject and bears a radiation image thereof, is irradiated onto the radiation image detector 30 from the side of the first electrode layer 31.

The radiation passes through the first electrode layer 31 and is irradiated onto the photoconductive layer 32. Thereby, charge pairs corresponding to the amount of radiation are generated in the photoconductive layer 32. Among the generated charge pairs, positive electric charges (positive holes) move toward the first electrode layer 31, combine with the negative charges which have been injected by the high voltage source, and disappear.

Meanwhile, negative electric charges (electrons) from among the generated charge pairs move toward the pixel electrodes 35 along the electrical field distribution formed by the application of the biasing voltage. The electrons are collected by the pixel electrodes 35, and accumulated in the accumulating capacitors 36, which are electrically connected to the pixel electrodes 35. The photoconductive layer 32 generates electric charges in an amount corresponding to the dosage of irradiated radiation. Therefore, electric charges corresponding to image data borne by the radiation are accumulated in the accumulating capacitor 36 of each pixel portion 34.

When the electrical field is formed, if the edges of the pixel electrodes 35 are not covered by the dielectrics 35c, the electrical fields will become concentrated at these edges, and charge injection will occur. However, the amount of injected charges can be reduced and image faults can be suppressed in the radiation image detector 30 of the present embodiment, because the dielectrics 35c are provided.

The charge injection preventing layer 35d increases the transport properties of negative charges, to facilitate movement of the negative charges from the photoconductive layer 32 to the pixel electrodes 35. At the same time, the positive charges which are charged in the pixel electrodes 35 are prevented from being injected into the photoconductive layer 32.

When the radiation image which has been recorded on the radiation image detector 30 is read out, signals for turning the switching elements 37 ON are sequentially input via the scanning lines 38, and the electric charges accumulated in the accumulating capacitors 36 are taken out via the data lines 39. Amplifiers 40 detect the amount of electrical charges for each pixel, to read out image data.

Note that in radiation image detectors that employ the electrical readout method as well, the configuration of the dielectrics and the charge injection preventing layer is not limited to that illustrated in FIG. 6. Alternatively, configurations such as those illustrated in FIG. 3 and FIG. 4 may be applied.

The present invention is not limited to the embodiments described above. Various changes and modifications can be made, as long as they do not stray from the spirit and scope of the inventions claimed hereinafter. For example, the second linear electrodes 5d described in the first embodiment may be formed by a light shielding material, instead of the color filter layers 6b being provided. In addition, all of the linear electrodes of a radiation image detector that employs the optical readout method may be charge generating electrodes.

What is claimed is:

1. A radiation image detector, comprising:

an electrode layer that transmits recording electromagnetic waves bearing image information;

a photoconductive layer that generates electric charges when irradiated by the recording electromagnetic waves which have passed through the electrode layer;

a plurality of detecting electrodes provided on the side of the photoconductive layer opposite that of the electrode layer, for detecting signals corresponding to the electric charges generated in the photoconductive layer;

an accumulating section, for recording the image information, that accumulates the electric charges generated in the photoconductive layer when irradiated by the recording electromagnetic waves;

dielectrics that cover the edges of the detecting electrodes, the edges being the side surfaces and portions of surfaces of the detecting electrodes, which are continuous with the side surfaces, that face the photoconductive layer; and a charge injection preventing layer that functions as a conductor with respect to electric charges of the same polarity as the electric charges which are accumulated during recording of the image information, and functions as an insulator with respect to electric charges of the opposite polarity from the accumulated electric charges, provided to cover at least the surfaces of the detecting electrodes that face the photoconductive layer which are not covered by the dielectric.

2. A radiation image detector as defined in claim 1, wherein:

the charge injection preventing layer also covers the dielectric; and the angle formed by the interface between the dielectric and the surfaces of the detecting electrodes that face the photoconductive layer and the interface between the dielectric and the charge injection preventing layer is within a range of 5 to 45 degrees.

* * * * *